(12) United States Patent
Yang et al.

(10) Patent No.: US 10,991,177 B2
(45) Date of Patent: *Apr. 27, 2021

(54) METHOD FOR PROCESSING VEHICLE FAULT, APPARATUS, DEVICE, AND STORAGE MEDIUM

(71) Applicant: BAIDU ONLINE NETWORK TECHNOLOGY (BEIJING) CO., LTD., Beijing (CN)

(72) Inventors: Kai Yang, Beijing (CN); Lei Zhang, Beijing (CN); Hongda Zhang, Beijing (CN); Wuzhao Zhang, Beijing (CN); Zhuo Chen, Beijing (CN); Xiaoyan Wang, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 2 days.

This patent is subject to a terminal disclaimer.

(21) Appl. No.: 16/512,687

(22) Filed: Jul. 16, 2019

(65) Prior Publication Data

US 2020/0074771 A1 Mar. 5, 2020

(30) Foreign Application Priority Data

Aug. 30, 2018 (CN) .......................... 201811001630.5

(51) Int. Cl.
*G07C 5/08* (2006.01)
*B60R 16/023* (2006.01)
(Continued)

(52) U.S. Cl.
CPC ....... *G07C 5/0816* (2013.01); *B60H 1/00742* (2013.01); *B60Q 1/52* (2013.01); *B60R 16/0232* (2013.01); *G05D 1/0088* (2013.01)

(58) Field of Classification Search
CPC .. G07C 5/0816; G07C 5/008; B60R 16/0232; G05D 1/0088; B60H 1/00742; B60Q 1/52; G05B 23/0221
See application file for complete search history.

(56) References Cited

U.S. PATENT DOCUMENTS

| 5,565,856 A | 10/1996 | Takaba et al. |
| 2018/0096602 A1* | 4/2018 | She .................. B60W 10/04 |

(Continued)

FOREIGN PATENT DOCUMENTS

| CN | 102834818 A | 12/2012 |
| CN | 104950740 A | 9/2015 |

(Continued)

OTHER PUBLICATIONS

Zhang et al., "On the Optimization of Maintenance Process of Metro Vehicles Based on FMECA", 2017, pp. 74-78.

(Continued)

*Primary Examiner* — Daryl C Pope
(74) *Attorney, Agent, or Firm* — Dilworth IP, LLC

(57) ABSTRACT

A method for processing vehicle fault, the method includes obtaining, by a first vehicle fault processing device, first data information of a main system of a vehicle in real time, obtaining second data information of the main system sent by a second vehicle fault processing device, and sending the first data information to the second vehicle fault processing device, so that the second vehicle fault processing device performs fault determination on the main system according to the first data information and the second data information; determining, by the first vehicle fault processing device, whether a fault has occurred in the main system according to the first data information and the second data information; and performing, by the first vehicle fault processing device, corresponding control on the vehicle according to a pre- (Continued)

configured control authority if the fault has occurred in the main system.

20 Claims, 4 Drawing Sheets

(51) Int. Cl.
  *G05D 1/00* (2006.01)
  *B60H 1/00* (2006.01)
  *B60Q 1/52* (2006.01)

(56) References Cited

U.S. PATENT DOCUMENTS

| 2019/0036625 | A1* | 1/2019 | Tsujita | H04B 1/04 |
| 2019/0086914 | A1* | 3/2019 | Yen | G05D 1/0212 |

FOREIGN PATENT DOCUMENTS

| CN | 105253076 A | 1/2016 |
| CN | 106054868 A | 10/2016 |
| CN | 106233260 A | 12/2016 |
| CN | 106462485 A | 2/2017 |
| CN | 6224186 B1 | 11/2017 |
| CN | 107885184 A | 4/2018 |
| JP | 2015228051 A | 12/2015 |
| JP | 2018022222 A | 2/2018 |
| JP | 2018097697 A | 6/2018 |

OTHER PUBLICATIONS

Notice of Allowance dated Feb. 3, 2020 in Corresponding Chinese Application No. 201811001630.5, 4 pages.
Notice of Publication dated Mar. 13, 2020 in Corresponding Chinese Application No. 201811001630.5, 25 pages.
JPO Office Action; Application No. JP 201811001630.5; dated Oct. 29, 2019; 6 pages.

* cited by examiner

METHOD FOR PROCESSING VEHICLE FAULT, APPARATUS, DEVICE, AND STORAGE MEDIUM

CROSS-REFERENCE TO RELATED APPLICATIONS

This application claims priority to Chinese Patent Application No. 201811001630.5, filed on Aug. 30, 2018, which is hereby incorporated by reference in its entirety.

FIELD

The present disclosure relates to the technical field of unmanned driving and, in particular, to a method for processing vehicle fault, an apparatus, a device, and a storage medium.

BACKGROUND

An unmanned vehicle is a new type of smart automobile, which primarily operates through an electronic control unit (ECU) to exercise accurate control and computational analysis over various components of the vehicle to realize full automation in the vehicle, achieving the purpose of unmanned driving of the vehicle.

In an unmanned system, unforeseeable safety hazard may be incurred if an unmanned vehicle continues to run when a fault has occurred in its system software and/or hardware and timely data transfer has become impossible.

SUMMARY

The present application provides a method for processing vehicle fault, an apparatus, a device and a storage medium, so as to solve the defects of low vehicle safety in the prior art.

A first aspect of the present application provides a method for processing vehicle fault, including:

obtaining by a first vehicle fault processing device, first data information of a main system of a vehicle in real time, obtaining second data information of the main system sent by a second vehicle fault processing device, and sending the first data information to the second vehicle fault processing device, so that the second vehicle fault processing device performs fault determination on the main system according to the first data information and the second data information;

determining, by the first vehicle fault processing device, whether a fault has occurred in the main system according to the first data information and the second data information; and performing, by the first vehicle fault processing device, corresponding control on the vehicle according to a pre-configured control authority if the fault has occurred in the main system.

A second aspect of the present application provides a method for processing vehicle fault, including:

obtaining by a second vehicle fault processing device, second data information of a main system of a vehicle in real time, obtaining first data information of the main system sent by a first vehicle fault processing device, and sending the second data information to the first vehicle fault processing device, so that the first vehicle fault processing device performs fault determination on the main system according to the first data information and the second data information;

determining, by the second vehicle fault processing device, whether a fault has occurred in the main system according to the first data information and the second data information; and performing, by the second vehicle fault processing device, corresponding control on the vehicle according to a pre-configured control authority if the fault has occurred in the main system.

A third aspect of the present application provides an apparatus for processing vehicle fault, including:

a first obtaining module, configured for a first vehicle fault processing device to obtain first data information of a main system of a vehicle in real time, obtain second data information of the main system sent by a second vehicle fault processing device, and send the first data information to the second vehicle fault processing device, so that the second vehicle fault processing device performs fault determination on the main system according to the first data information and the second data information;

a first determining module, configured for the first vehicle fault processing device to determine whether a fault has occurred in the main system according to the first data information and the second data information; and a first processing module, configured for the first vehicle fault processing device to perform corresponding control on the vehicle according to a pre-configured control authority, if the fault has occurred in the main system.

A fourth aspect of the present application provides an apparatus for processing vehicle fault, including:

a second obtaining module, configured for a second vehicle fault processing device to obtain second data information of a main system of a vehicle in real time, obtain first data information of the main system sent by a first vehicle fault processing device, and send the second data information to the first vehicle fault processing device, so that the first vehicle fault processing device performs fault determination on the main system according to the first data information and the second data information;

a second determining module, configured for the second vehicle fault processing device to determine whether a fault has occurred in the main system according to the first data information and the second data information; and a second processing module, configured for the second vehicle fault processing device to perform corresponding control on the vehicle according to a pre-configured control authority, if the fault has occurred in the main system.

A fifth aspect of the present application provides a device for processing vehicle fault, including at least one processor and memory;

the memory stores a computer program; the at least one processor executes the computer program stored in the memory to implement the method according to the first aspect.

A sixth aspect of the present application provides a device for processing vehicle fault, including at least one processor and memory;

the memory stores a computer program; the at least one processor executes the computer program stored in the memory to implement the method according to the second aspect.

A seventh aspect of the present application provides a computer readable storage medium, where the computer readable storage medium stores a computer program, the method according to the first aspect is implemented when the computer program is executed.

An eighth aspect of the present application provides a computer readable storage medium, where the computer readable storage medium stores a computer program, the method according to the second aspect is implemented when the computer program is executed.

In methods, apparatuses, devices, and storage mediums for processing vehicle fault, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system.

BRIEF DESCRIPTION OF DRAWINGS

To describe the technical solutions in embodiments of the present application or in the prior art more clearly, the following briefly introduces the accompanying drawings needed for describing the embodiments or the prior art. Apparently, the accompanying drawings in the following description illustrate some embodiments of the present application, and persons of ordinary skill in the art may still derive other drawings from the accompanying drawings without any creative effort.

The embodiments defined by the present application have been shown by the drawings described above, which will be described in detail below. The drawings and text description are not intended to limit the scope of the present disclosure in any way, but to describe the concept of the present disclosure to those skilled in the art with reference to the specific embodiments.

DETAILED DESCRIPTION

To make the objectives, technical solutions, and advantages of embodiments of the present disclosure clearer, the following clearly and comprehensively describes the technical solutions in embodiments of the present disclosure with reference to the accompanying drawings in embodiments of the present disclosure. Apparently, the described embodiments are merely a part rather than all embodiments of the present disclosure. All other embodiments obtained by persons of ordinary skill in the art based on embodiments of the present disclosure without creative effort shall fall within the protection scope of the present disclosure.

Firstly, some of the terminologies involved in the present application are explained.

Computing device: a device capable of computational processing, which may be an industrial personal computer (IPC), a general term referring to tools that use bus architecture and offer testing and controlling to manufacturing processes, machines, electrical devices and processing devices. The IPC has essential computer features and characteristics. For instance, an IPC may have a computer mainboard, a CPU, a hard drive, a memory, a peripheral device, an interface, as well as an operating system, a control network, a protocol, computational capacity, and a friendly human-machine interface. Products and technologies in the IPC sector are highly specialized. They may be categorized as intermediate products designed to provide various sectors with industrial computers that are stable, reliable, embedded, and smart. In an unmanned vehicle, the IPC, which may be referred to as a vehicle terminal, serves as a tool for testing and controlling various aspects of the vehicle. The IPC may also be some other computing device usable in a vehicle, which will not be specifically limited herein.

Main system: the main system of a computing device (e.g., an IPC) of an unmanned vehicle, which is responsible for collecting, planning and controlling of sensory data of the vehicle for realizing autopilot.

Figure 1:
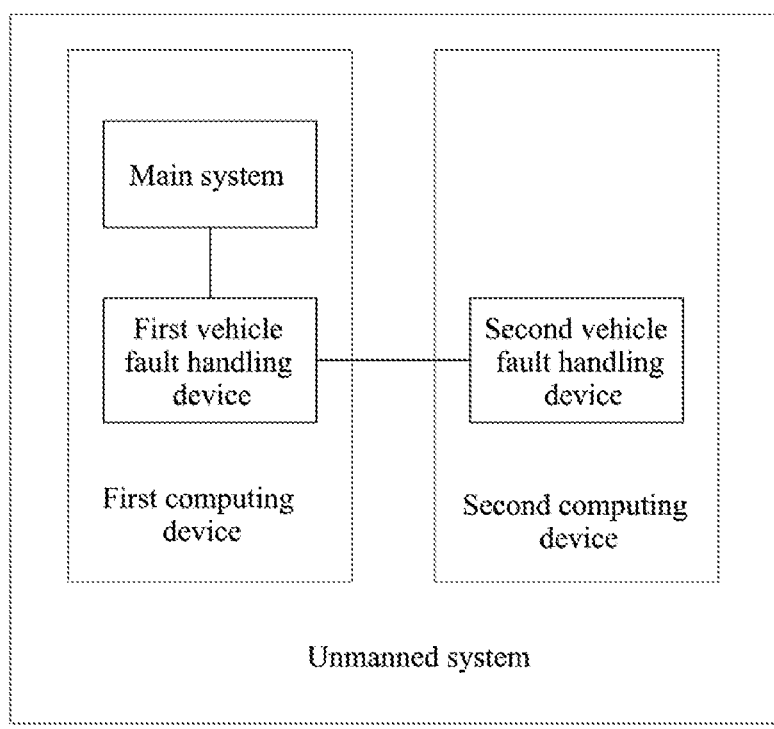
FIG. 1 is a schematic structural diagram of an unmanned system suitable in an embodiment of the present application.

Methods for processing vehicle fault according to embodiments of the present application are applicable to the following unmanned system: as shown in FIG. 1, it is a schematic structural diagram of an unmanned system suitable in an embodiment of the present application. The unmanned system includes a first computing device which includes a function security subsystem (i.e. a first vehicle fault processing device) and may further include a main system, so that the function security subsystem may be established in the same hardware (the first computing device or an industrial personal computer) as the main system to monitor the main system, so as to realize the discovery and recall of vehicle fault. The first vehicle fault processing device may be the first computing device, and in order to distinguish it from the main system, it is considered that the first vehicle fault processing device and the main system are disposed on the first computing device. And a second vehicle fault processing device is redundantly disposed in the unmanned system, the second vehicle fault processing device itself may be a second computing device, or the second vehicle fault processing device may be considered to be disposed on the second computing device. The first vehicle fault processing device monitors the main system in real time, and at the same time monitors each other with the second vehicle fault processing device, so as to effectively improve robustness of the unmanned system. The second vehicle fault processing device has the equal status as the first vehicle fault processing device, that is, has completely consistent decision-making capabilities. Specifically, the specific processing capabilities of the first vehicle fault processing device and the second vehicle fault processing device may be divided into three layers which are inspection layer, decision-making layer and control layer, the inspection layer is monitoring and obtaining parameters, and the decision-making layer is judging fault conditions and making decisions according to the obtained monitoring parameters. Both of them have equal decision-making layer power, the control layer is controlling the vehicle according to the decision of the decision-making layer. In embodiments of the present application, two vehicle fault processing devices are respectively responsible for collecting different parameter data and sharing the data with each other, so that both of them may obtain the full amount of data information of the main system, and since both of them have the same decision-making layer, fault results may be obtained using the same decision-making algorithm. Different control authorities may be configured for both of them, which may be executed according to the fault results, to realize centreless fault processing. That is, in a driverless main system and a redundant system, homogeneous policy layers are established, and the homogeneous policy layers output consistent processing results, and when a fault has occurred in a main hardware, the isomorphic policy layer of the redundant hardware continues to output the consistent processing result to ensure the correct processing of fault. It can be understood that in other similar driverless functional systems, methods of processing vehicle fault according to embodiments of the present application may also be adopted, the methods of processing vehicle fault according to embodiments of the present application are not limited to be used in the unmanned system.

Moreover, the terms "first", "second", and the like are used for the purpose of description only, and are not to be understood as indicating or implying relative importance or implicitly indicating the number of a technical feature indicated. In the following description of the respective embodiments, the meaning of "a plurality" is two or more, unless specifically defined otherwise.

The following specific embodiments may be combined with each other, and the same or similar concepts or processes may not be described in some embodiments. Embodiments of the present disclosure will be described below with reference to the accompanying drawings.

Embodiment 1

The embodiment provides a method for processing vehicle fault, which is used for performing vehicle fault processing on an unmanned vehicle. An execution body of the embodiment is an apparatus for processing vehicle fault, and the apparatus may be disposed on a first computing device of the vehicle, and may be specifically disposed on a first vehicle fault processing device.

Figure 2:
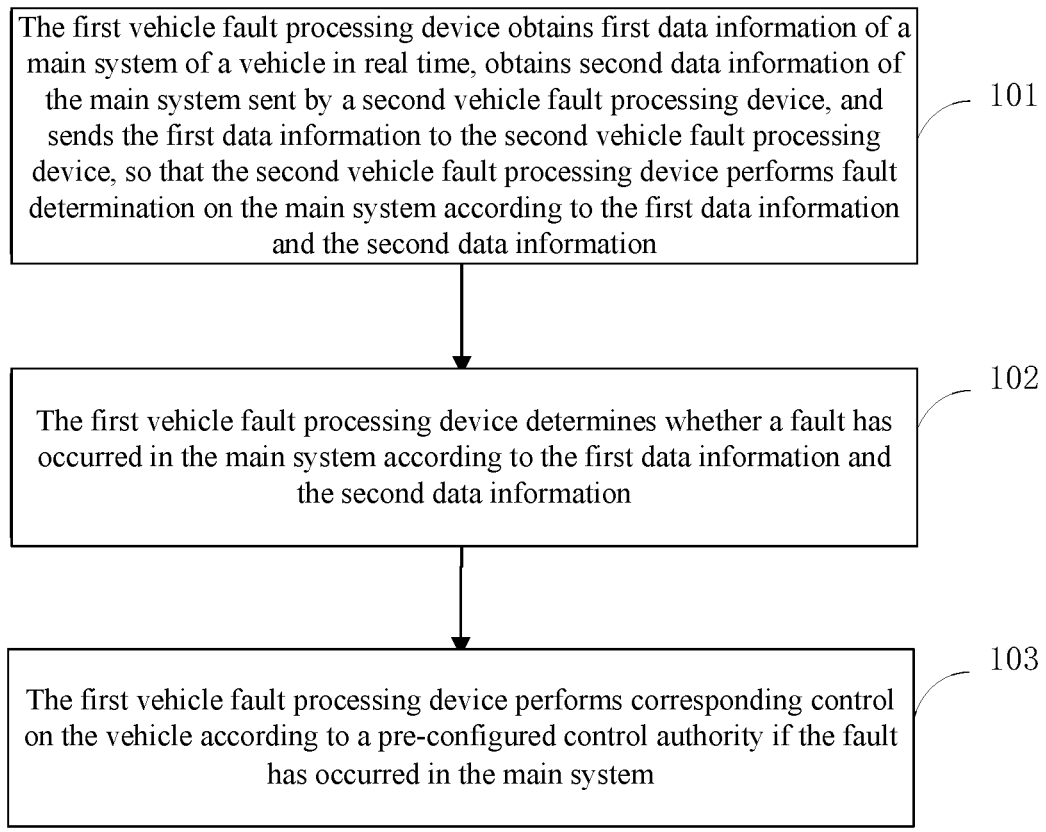
FIG. 2 is a schematic flowchart of a method for processing vehicle fault according to an embodiment of the present disclosure.

As shown in FIG. 2, it is a schematic flowchart of a method for processing vehicle fault according to an embodiment of the present disclosure, where the method includes:

Step 101: The first vehicle fault processing device obtains first data information of a main system of a vehicle in real time, obtains second data information of the main system sent by a second vehicle fault processing device, and sends the first data information to the second vehicle fault processing device, so that the second vehicle fault processing device performs fault determination on the main system according to the first data information and the second data information.

Step 102: The first vehicle fault processing device determines whether a fault has occurred in the main system according to the first data information and the second data information.

Step 103: The first vehicle fault processing device performs corresponding control on the vehicle according to a pre-configured control authority if the fault has occurred in the main system.

Specifically, the first vehicle fault processing device is established on a first computing device where the main system of the unmanned vehicle is located, which monitors state of the main system in real time, obtains the first data information of the main system, and performs fault detection and recall in time. And the second vehicle fault processing device is redundantly established in the unmanned vehicle, and the second vehicle fault processing device itself may be a computing device, which may be named as a second computing device, and may also be considered that the second vehicle fault processing device is disposed on the second computing device. The first vehicle fault processing device monitors the main system in real time, and at the same time monitors each other with the second vehicle fault processing device, so as to effectively improve robustness of the unmanned system. The second vehicle fault processing device also monitors some parameters of the main system in real time, and obtains the second data information of the main system. The first vehicle fault processing device and the second vehicle fault processing device may share the first data information and the second data information, that is, the first vehicle fault processing device, after obtaining the first data information in real time, sends the first data information to the second vehicle fault processing device, and the second vehicle fault processing device, after obtaining the second data information in real time, sends the second data information to the first vehicle fault processing device, so that both of the first vehicle fault processing device and the second vehicle fault processing device may obtain full data information of the main system. The first vehicle fault processing device and the second vehicle fault processing device have the equal status, have completely consistent decision-making layers, and may determine consistent fault results using the same decision algorithm.

For the first vehicle fault processing device, after obtaining the first data information and the second data information, the first vehicle fault processing device may determine whether a fault has occurred in the main system according to the first data information and the second data information, and of course the second vehicle fault processing device may also determine whether a fault has occurred in the main system according to the first data information and the second data information.

The first vehicle fault processing device, after determining that a fault has occurred in the main system, performs corresponding control on the vehicle according to the pre-configured control authority.

Specifically, control authorities of the first vehicle fault processing device and the second vehicle fault processing device may be pre-configured, that is, it is predetermined that when which faults happen the first vehicle fault processing device controls the device, and when which faults happen the second vehicle fault processing device controls the device. After the decision-making layer obtains a fault result, the first vehicle fault processing device determines the fault result to make sure whether it shall control the vehicle according to the fault result and the pre-configured control authority, and if yes, the first vehicle fault processing device accordingly controls the vehicle, and if no, there is no need to control and the second vehicle fault processing device performs the control.

Exemplarily, the first vehicle fault processing device may obtain the full data of the main system in real time, the full data include frequency information, delay information, heartbeat detection information, collision detection information, chassis collection information (such as steering angle information, braking information, and vehicles control information, etc.), automatic driving assistance process information, security gateway monitoring information, and first computing device environment information, and the like. The second vehicle fault processing device obtains partial data (including key fault data such as collision detection information) of the main system in real time which specifically may be set in a configuration file, and the parameter allocation monitored by the first vehicle fault processing device and the second vehicle fault processing device may be configured according to actual needs.

The first data information here may be relevant data information of any layer or link in the main system, for example, the main system may be divided into three layers of perception, planning and control. Perception is the ability of an unmanned system collecting information from environments and extracting relevant knowledge from therein, where environmental perception refers in particular to scene comprehensive ability to an environment, such as semantic classification of data (the location of an obstacle, the detection of a road sign/marker, and the detection of a pedestrian and a vehicle). In general, localization is also part of perception, which is the ability of an unmanned vehicle to determine its position relative to an environment. Planning is a process for the unmanned vehicle to make some purposeful decisions for a certain target, for the unmanned vehicle, this target usually refers to starting from a place of departure to a destination while avoiding obstacles and continuously optimizing driving trajectory and behavior to ensure the safety and comfort of a passenger. The planning layer is usually subdivided into three layers: mission planning, behavioral planning, and motion planning Control is the ability of an unmanned vehicle to accurately perform planned actions which are derived from higher layers. Each layer may involve the transmission of a wide variety of data which may being normally and accurately transmitted is an important basis for the unmanned vehicle to be fully automatic driven. The first vehicle fault processing device may obtain the first data information of these data in real time.

For the way that the first vehicle fault processing device obtains the first data information of the main system, it may be that the main system takes the initiative to send relevant data to the first vehicle fault processing device when executes each data flow, or may be that the first vehicle fault processing device requests for data information from the main control system in real time, and the specific manner is not limited. In summary, the first vehicle fault processing device may obtain various data information of the main system that should be obtained according to the configuration file.

Exemplarily, the first vehicle fault processing device may obtain the above data information from an in-vehicle ECU, the in-vehicle ECU may collect a signal of each sensor on the vehicle, and generate a control signal according to the collected signal, and the first vehicle fault processing device may be wired or wireless connected to the ECU and sends a data obtaining request to the ECU, and receives data information sent by the ECU. The first vehicle fault processing device may also directly communicate with each sensor on the vehicle, and may obtain the data information of the main system by the following way: obtaining information detected by a sensor related to a data stream of the main system, such as a collision detection related sensor, a chassis collection related sensor, a security gateway monitoring related sensor, an industrial control computer environment-related sensor, and the like. The sensor may include an image sensor, a mechanical sensor, a speed sensor, an acceleration sensor, a temperature sensor, a distance sensor, and the like. The first vehicle fault processing device may also be agreed with the main system, in the whole process of the main system implementing perception data collection, planning and control, which data streams need to be sent to the first vehicle fault processing device, or relevant information of the data streams is sent to the first vehicle fault processing device, and the like. In short, the specific obtaining manner may be set according to actual needs, and is not described herein.

Similarly, the second vehicle fault processing device may obtain the second data information of the main system and send it to the first vehicle fault processing device. The details will not be described again.

The first vehicle fault processing device may determine whether a fault has occurred in the main system according to the first data information and the second data information, and if it is determined that a fault has occurred in the main system, corresponding control is performed according to the pre-configured control authority, for example, sending a brake instruction to a brake system for deceleration or stop, and for another example, generating alarm information for alarm, and the like.

Specifically, the way for determining whether a fault has occurred in the main system according to the first data information and the second data information may be, for example, that presetting a preset reference range (or a preset condition) for each type of data information, comparing the obtained first data information or the second data information with the corresponding preset reference range, if the preset reference range is met, it is determined that a fault has not occurred in the main system, and if any one or more of the data information does not meet the preset range, it is determined that a fault has occurred in the main system.

In an embodiment, each type of data information may correspond to different fault codes, and different fault codes may correspond to different control measures, for example, frequency information has a normal range of 10-15 HZ, and the control measure is: if the current frequency is greater than 5 HZ and less than 10 HZ, deceleration is performed, if the current frequency is less than 5 HZ, emergency stop is performed, and the like. This is only exemplary description, and may be set according to actual needs, and is not limited herein.

In methods for processing vehicle fault, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system.

Embodiment 2

This embodiment further supplements the method provided in Embodiment 1.

As an implementation manner, on the basis of the above Embodiment 1, the method may further include:

Step 2011: The first vehicle fault processing device obtains state information of the second vehicle fault processing device in real time.

Step 2012: The first vehicle fault processing device determines whether a fault has occurred in the second vehicle fault processing device according to the state information of the second vehicle fault processing device; and Step 2013: The first vehicle fault processing device obtains a control authority of the second vehicle fault processing device, and performs corresponding control on the vehicle if the fault has occurred in the second vehicle fault processing device.

Specifically, the first vehicle fault processing device may also monitor state of the second vehicle fault processing device in real time, that is, monitor state of the second computing device to see if it is online or fails. The first vehicle fault processing device may obtain the state information of the second vehicle fault processing device, and determine whether a fault has occurred in the second vehicle fault processing device according to the state information of the second vehicle fault processing device. If a fault has occurred in the second vehicle fault processing device, the first vehicle fault processing device takes over the control authority of the second vehicle fault processing device and performs corresponding control on the vehicle. That is, the control authority originally need to be executed by the second vehicle fault processing device may be taken over by the first vehicle fault processing device after a fault has occurred in the second vehicle fault processing device, to solve the problem that the driving state of the vehicle cannot be controlled in time, causing an accident when a fault has occurred in the main system, a fault has occurred in the second vehicle fault processing device either, and the control authority corresponding to the fault of the main system belongs to the second vehicle fault processing device.

In an embodiment, the status information of the second vehicle fault processing device may be heartbeat detection information of the second vehicle fault processing device, and may also be environment information of the second vehicle fault processing device, such as CPU usage, memory usage and other environment information of the second vehicle fault processing device.

In an embodiment, the first vehicle fault processing device determines whether a fault has occurred in the second vehicle fault processing device according to the state information of the second vehicle fault processing device includes:

If the first vehicle fault processing device does not acquire the heartbeat detection information of the second vehicle fault processing device within a first preset time, the first vehicle fault processing device determines that a fault has occurred in the second vehicle fault processing device; if the first vehicle fault processing device determines that a fault has not occurred in the second vehicle fault processing device according to the heartbeat detection information of the second vehicle fault processing device, the first vehicle fault processing device determines whether a fault has occurred in the second vehicle fault processing device according to the environmental information of the second vehicle fault processing device.

Specifically, the first vehicle fault processing device and the second vehicle fault processing device may detect whether the second vehicle fault processing device is online by heartbeat mechanism, for example, appointing that the second vehicle fault processing device needs to send a heartbeat packet (i.e. the heartbeat detection information) to the first vehicle fault processing device at regular intervals, if the first vehicle fault processing device does not receive the heartbeat packet sent by the second vehicle fault processing device within the first preset time, it is proved that the second vehicle fault processing device has been offline, the normal control authority may not be implemented, and the first vehicle fault processing device needs to take over the control authority of the second vehicle fault processing device to perform corresponding control, such as issuing an alarm to remind relevant personnel that a fault has occurred in the second vehicle fault processing device and needs to be maintained. Alternatively, when the second vehicle fault processing device may not work normally due to the CPU usage rate of the second vehicle fault processing device being too high or the memory usage rate being too high, the first vehicle fault processing device may take over the control authority of the second fault processing device, to ensure effectively monitoring the main system and performing corresponding control in time when a fault has occurred in the main system. Specific fault conditions may be set according to actual needs, which is not limited in this embodiment.

Certainly, the second vehicle fault processing device may also monitor state of the first vehicle fault processing device in real time, or may monitor state of the first computing device, and the specific operation of the monitoring is consistent with that of the first vehicle fault processing device monitoring the second vehicle fault processing device, which is not described again.

As another implementation manner, on the basis of the above Embodiment 1, the first data information includes at least one of frequency information, delay information, heartbeat detection information, collision detection information, chassis collection information, automatic driving assistance process information, security gateway monitoring information and first computing device environment information, and the like; the second data information includes partial data information of the frequency information, the delay information, the heartbeat detection information, the collision detection information, the chassis collection information, the automatic driving assistance process information, the security gateway monitoring information, and the first computing device environment information, and the like. The data information of which parameters is specifically monitored may be set according to actual needs.

In an embodiment, the first vehicle fault processing device determines whether a fault has occurred in the main system according to the first data information and the second data information includes:

for each type of data information, the first vehicle fault processing device determines whether it meets its corresponding preset reference range, where the data information is the first data information or the second data information;

the first vehicle fault processing device determines that a fault has occurred in the main system if there is at least one of the data information does not meet its corresponding preset reference range.

As another implementation manner, on the basis of the above Embodiment 1, step 103 specifically includes:

Step 1031: The first vehicle fault processing device determines whether there is a control authority corresponding to a currently occurring fault according to the pre-configured control authority if a fault has occurred in the main system.

Step 1032: The first vehicle fault processing device controls driving state of the vehicle if it is determined that there is the control authority corresponding to the currently occurring fault.

Step 1033: The first vehicle fault processing device controls the driving state of the vehicle if it is determined that there is no control authority corresponding to the currently occurring fault.

It should be noted that the manners in this embodiment may be implemented separately, or may be implemented in combination in any combination way in the case of no conflict.

The first vehicle fault processing device, after determining that a fault has occurred in the main system, may control the driving state of the vehicle on the one hand, and may also alert and remind relevant personnel, such as passengers, management personnel, vehicle maintenance personnel, and the like.

Specific alarm ways may be an audible alarm, an alarm displaying on a screen of the vehicle, or an alarm sent to a remote control server of the vehicle, which are not limited.

Exemplarily, sending an alarm prompt tone to prompt passengers in the vehicle to perform corresponding security processing, or to prompt other vehicles around to avoid, or to prompt an outside vehicle test management personnel to maintain and the like.

It should be noted that the manners in this embodiment may be implemented separately, or may be implemented in combination in any combination way in the case of no conflict.

In the method for processing vehicle fault according to this embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system. And the first vehicle fault processing device may also monitor the second vehicle fault processing device in real time to solve the problem that the driving state of the vehicle cannot be controlled in time, causing an accident when a fault has occurred in the main system, a fault has occurred in the second vehicle fault processing device either, and the control authority corresponding to the fault of the main system belongs to the second vehicle fault processing device.

Embodiment 3

The embodiment provides a method for processing vehicle fault, which is used for performing vehicle fault processing on an unmanned vehicle. An execution body of the embodiment is an apparatus for processing vehicle fault, and the apparatus may be disposed on a second computing device of the vehicle, and may be specifically disposed on a second vehicle fault processing device.

Figure 3:
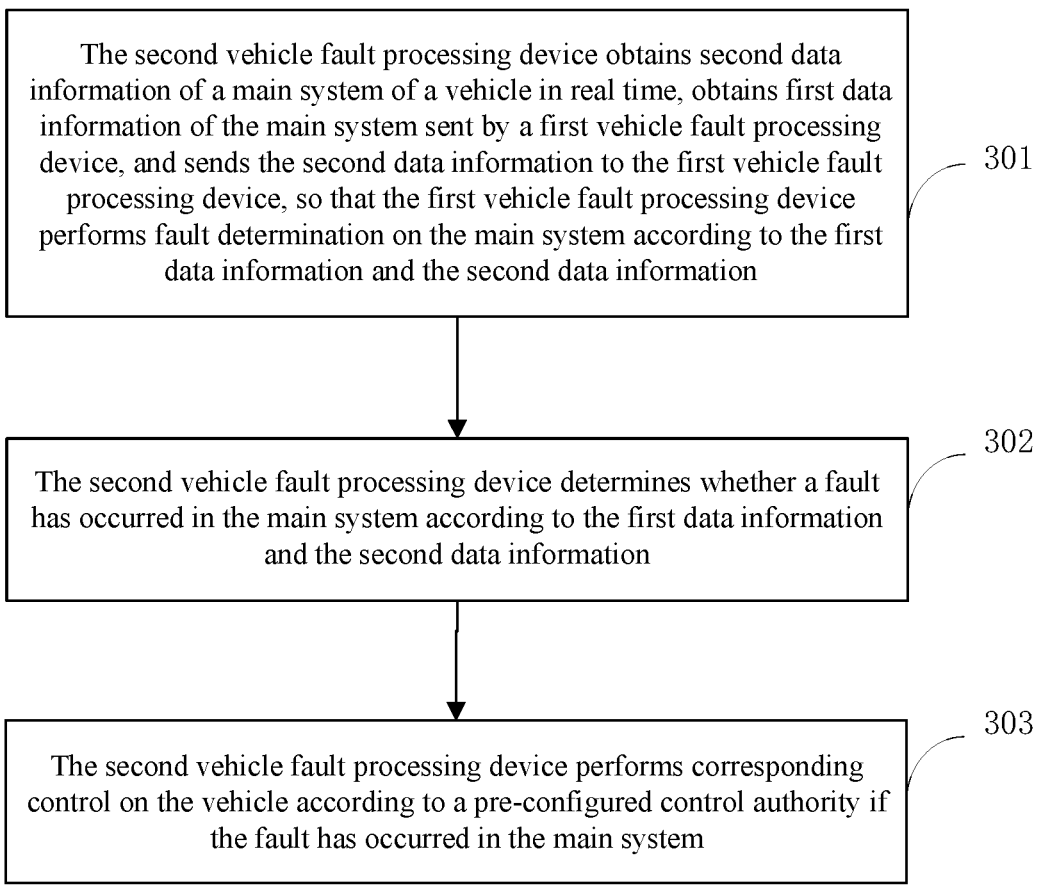
FIG. 3 is a schematic flowchart of a method for processing vehicle fault according to another embodiment of the present disclosure.

FIG. 3 is a schematic flowchart of a method for processing vehicle fault according to another embodiment of the present disclosure, where the method includes:

Step 301: The second vehicle fault processing device obtains second data information of a main system of a vehicle in real time, obtains first data information of the main system sent by a first vehicle fault processing device, and sends the second data information to the first vehicle fault processing device, so that the first vehicle fault processing device performs fault determination on the main system according to the first data information and the second data information.

Step 302: The second vehicle fault processing device determines whether a fault has occurred in the main system according to the first data information and the second data information.

Step 303: The second vehicle fault processing device performs corresponding control on the vehicle according to a pre-configured control authority if the fault has occurred in the main system.

It should be noted that the foregoing steps performed by the second vehicle fault processing device are the same as or similar to that in the first vehicle fault processing device, which is not described herein again. The difference is that parameters monitored by the first vehicle fault processing device and the second vehicle fault processing device may be different, and the control authorities are different.

In the method for processing vehicle fault according to this embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system.

Embodiment 4

This embodiment makes a further supplement to the method of the third embodiment.

As an implementation manner, based on the above embodiments, the method further includes:

Step 4011: The second vehicle fault processing device obtains state information of a first computing device in real time, and the first vehicle fault processing device and the main system are disposed on the first computing device.

Step 4012: The second vehicle fault processing device determines whether a fault has occurred in the first computing device according to the state information of the first computing device.

Step 4013: The second vehicle fault processing device obtains a control authority of the first vehicle fault processing device, and performs corresponding control on the vehicle if the fault has occurred in the first computing device.

That is, the second vehicle fault processing device may also monitor the state of the first vehicle fault processing device in real time, or may monitor the state of the first computing device, and the specific operation of the monitoring is consistent with that of the first vehicle fault processing device monitoring the second vehicle fault processing device, which is not described again.

In an embodiment, the state information of the first computing device includes heartbeat detection information of the first computing device and environment information of the first computing device.

In an embodiment, the second vehicle fault processing device determines whether a fault has occurred in the first computing device according to the state information of the first computing device includes:

the second vehicle fault processing device determines whether a fault has occurred in the first computing device according to the heartbeat detection information of the first computing device and the environment information of the first computing device.

The specific operation of the second vehicle fault processing device determining whether a fault has occurred in the first computing device is consistent with the operation of the first vehicle fault processing device determining whether a fault has occurred in the second computing device (or the second vehicle fault processing device), which is not described here again.

In an embodiment, the first data information includes at least one of frequency information, delay information, heartbeat detection information, collision detection information, chassis collection information, automatic driving assistance process information, security gateway monitoring information and first computing device environment information; the second data information includes partial data information of the frequency information, the delay information, the heartbeat detection information, the collision detection information, the chassis collection information, the automatic driving assistance process information, the security gateway monitoring information, and the first computing device environment information.

In an embodiment, Step 302 may specifically include:

for each type of data information, the second vehicle fault processing device determines whether it meets its corresponding preset reference range, where the data information is the first data information or the second data information; and determines that a fault has occurred in the main system if there is at least one of the data information does not meet its corresponding preset reference range.

As another implementation manner, on the basis of the foregoing embodiments, if a fault has occurred in the main system, Step 303 may specifically include:

Step 3031: The second vehicle fault processing device determines whether there is a control authority corresponding to a currently occurring fault according to the pre-configured control authority if a fault has occurred in the main system.

Step 3032: The second vehicle fault processing device controls driving state of the vehicle if it is determined that there is the control authority corresponding to the currently occurring fault.

Step 3033: The first vehicle fault processing device controls the driving state of the vehicle if it is determined that there is no control authority corresponding to the currently occurring fault.

It should be noted that the second vehicle fault processing device has the equal status as the first vehicle fault processing device, therefore each operation steps performed is consistent with that in the first vehicle fault processing device, and the specific operation is described in detail in Embodiment 1 or Embodiment 2, which is not described here again.

In the method for processing vehicle fault according to the embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system. And the second vehicle fault processing device may also monitor the first vehicle fault processing device in real time, that is, monitor the first computing device to solve the problem that the driving state of the vehicle cannot be controlled in time, causing an accident when a fault has occurred in the main system, a fault has occurred in the second vehicle fault processing device either, and the control authority corresponding to the fault of the main system belongs to the second vehicle fault processing device.

Embodiment 5

This embodiment provides a method for processing vehicle fault, which is used for performing the method of Embodiment 1.

Figure 4:
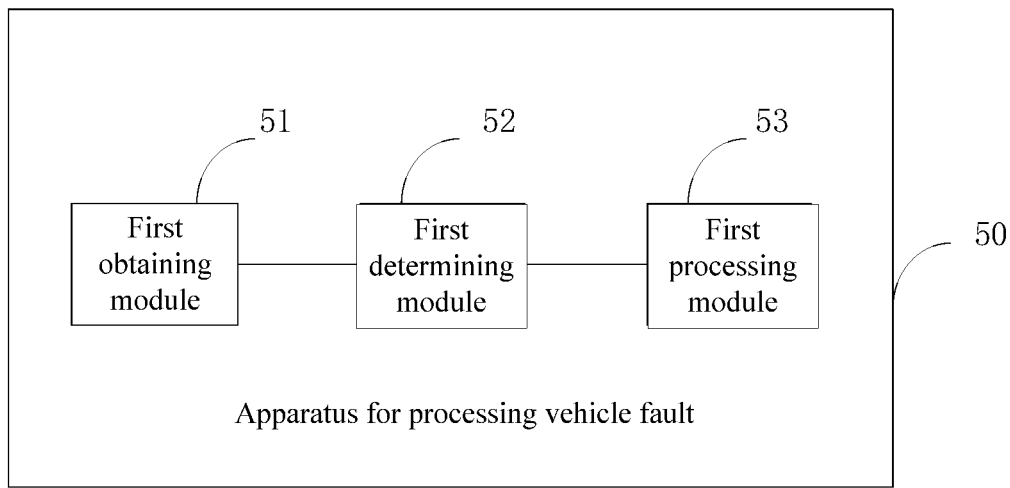
FIG. 4 is a schematic structural diagram of an apparatus for processing vehicle fault according to an embodiment of the present disclosure.

As shown in FIG. 4, it is a schematic structural diagram of an apparatus for processing vehicle fault according to an embodiment of the present disclosure. The apparatus for processing vehicle fault 50 includes a first obtaining module 51, a first determining module 52, and a first processing module 53.

The first obtaining module 51 is configured for a first vehicle fault processing device to obtain first data information of a main system of a vehicle in real time, obtain second data information of the main system sent by a second vehicle fault processing device, and send the first data information to the second vehicle fault processing device, so that the second vehicle fault processing device performs fault determination on the main system according to the first data information and the second data information; the first determining module 52 is configured for the first vehicle fault processing device to determine whether a fault has occurred in the main system according to the first data information and the second data information; and the first processing module 53 is configured for the first vehicle fault processing device to perform corresponding control on the vehicle according to a pre-configured control authority, if the fault has occurred in the main system.

Regarding the apparatus in this embodiment, the specific way for each module to perform operation has been described in detail in embodiments relating to the methods, which is not described in detail herein.

In the method for processing vehicle fault according to this embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system.

Embodiment 6

This embodiment makes a further supplement to the apparatus according to the above Embodiment 5, so as to perform the method provided in the above Embodiment 2.

In an implementation manner, on the basis of the above embodiment 5, the first obtaining module is further configured for the first vehicle fault processing device to obtain state information of the second vehicle fault processing device in real time;

the first determining module is further configured for the first vehicle fault processing device to determine whether a fault has occurred in the second vehicle fault processing device according to the state information of the second vehicle fault processing device; and the first processing module is further configured for the first vehicle fault processing device to obtain a control authority of the second vehicle fault processing device, and perform corresponding control on the vehicle, if a fault has occurred in the second vehicle fault processing device.

In an embodiment, the state information of the second vehicle fault processing device includes heartbeat detection information and environment information of the second vehicle fault processing device;

the first determining module is specifically configured:

for the first vehicle fault processing device to determine that a fault has occurred in the second vehicle fault processing device, if the first vehicle fault processing device does not obtain the heartbeat detection information of the second vehicle fault processing device within a first preset time; and for the first vehicle fault processing device to determine whether a fault has occurred in the second vehicle fault processing device according to the environmental information of the second vehicle fault processing device, if the first vehicle fault processing device determines that a fault has occurred in the second vehicle fault processing device according to the heartbeat detection information of the second vehicle fault processing device.

As another implementation manner, on the basis of the above embodiment 5, the first data information includes at least one of frequency information, delay information, heartbeat detection information, collision detection information, chassis collection information, automatic driving assistance process information, security gateway monitoring information and first computing device environment information; the second data information includes partial data information of the frequency information, the delay information, the heartbeat detection information, the collision detection information, the chassis collection information, the automatic driving assistance process information, the security gateway monitoring information, and the first computing device environment information; the first determining module is specifically configured:

for each type of data information, for the first vehicle fault processing device to determine whether it meets its corresponding preset reference range, where the data information is the first data information or the second data information; and for the first vehicle fault processing device to determine that a fault has occurred in the main system, if there is at least one of the data information does not meet its corresponding preset reference range.

As a further implementation manner, on the basis of the above embodiment 5, the first processing module is specifically configured:

for the first vehicle fault processing device to determine whether there is a control authority corresponding to a currently occurring fault according to the pre-configured control authority, if a fault has occurred in the main system; for the first vehicle fault processing device to control driving state of the vehicle, if it is determined that there is the control authority corresponding to the currently occurring fault; and for the second vehicle fault processing device to control the driving state of the vehicle, if it is determined that there is no control authority corresponding to the currently occurring fault.

Regarding the apparatus in this embodiment, the specific way for each module to perform operation has been described in detail in embodiments relating to the methods, which is not described in detail herein.

It should be noted that the manners in this embodiment may be implemented separately, or may be implemented in combination in any combination way in the case of no conflict.

In the apparatus for processing vehicle fault according to this embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system. And the first vehicle fault processing device may also monitor the second vehicle fault processing device in real time, that is, monitor the second computing device, to solve the problem that the driving state of the vehicle cannot be controlled in time, causing an accident when a fault has occurred in the main system, a fault has occurred in the second vehicle fault processing device either, and the control authority corresponding to the fault of the main system belongs to the second vehicle fault processing device.

Embodiment 7

This embodiment provides an apparatus for processing vehicle fault for performing the method of the third embodiment.

Figure 5:
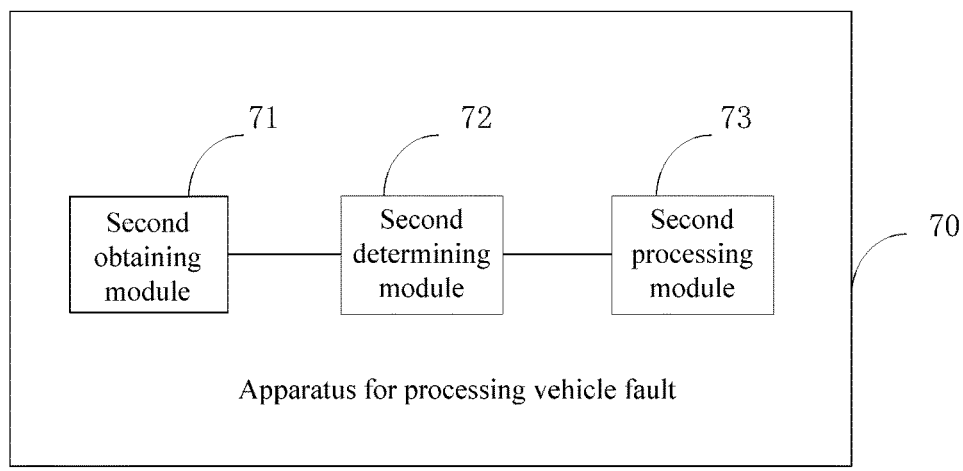
FIG. 5 is a schematic structural diagram of an apparatus for processing vehicle fault according to another embodiment of the present disclosure.

As shown in FIG. 5, it is a schematic structural diagram of an apparatus for processing vehicle fault according to another embodiment of the present disclosure. The apparatus for processing vehicle fault 70 includes a second obtaining module 71, a second determining module 72, and a second processing module 73.

The second obtaining module 71 is configured for a second vehicle fault processing device to obtain second data information of a main system of a vehicle in real time, obtain first data information of the main system sent by a first vehicle fault processing device, and send the second data information to the first vehicle fault processing device, so that the first vehicle fault processing device performs fault determination on the main system according to the first data information and the second data information; the second determining module 72 is configured for the second vehicle fault processing device to determine whether a fault has occurred in the main system according to the first data information and the second data information; and the second processing module 73 is configured for the second vehicle fault processing device to perform corresponding control on the vehicle according to a pre-configured control authority, if the fault has occurred in the main system.

Regarding the apparatus in this embodiment, the specific way for each module to perform operation has been described in detail in embodiments relating to the methods, which is not described in detail herein.

In the apparatus for processing vehicle fault according to this embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system. And the first vehicle fault processing device may also monitor the second vehicle fault processing device in real time, that is, monitor the second computing device, to solve the problem that the driving state of the vehicle cannot be controlled in time, causing an accident when a fault has occurred in the main system, a fault has occurred in the second vehicle fault processing device either, and the control authority corresponding to the fault of the main system belongs to the second vehicle fault processing device.

Embodiment 8

This embodiment makes a further supplement to the apparatus according to the above Embodiment 7, so as to perform the method provided in the above Embodiment 4.

As an implementation manner, on the basis of the above Embodiment 7, the second obtaining module is further configured for the second vehicle fault processing device to obtain state information of a first computing device in real time, where the first vehicle fault processing device and the main system are disposed on the first computing device; the second determining module is further configured for the second vehicle fault processing device to determine whether a fault has occurred in the first computing device according to the state information of the first computing device; and the second processing module is further configured for the second vehicle fault processing device to obtain a control authority of the first vehicle fault processing device, and perform corresponding control on the vehicle, if a fault has occurred in the first computing device.

In an embodiment, the state information of the first computing device includes heartbeat detection information of the first computing device and environment information of the first computing device; and the second determining module is specifically configured for the second vehicle fault processing device to determine whether a fault has occurred in the first computing device according to the heartbeat detection information of the first computing device and the environment information of the first computing device.

As another implementation manner, on the basis of the above Embodiment 7, the first data information includes at least one of frequency information, delay information, heartbeat detection information, collision detection information, chassis collection information, automatic driving assistance process information, security gateway monitoring information and first computing device environment information; the second data information includes partial data information of the frequency information, the delay information, the heartbeat detection information, the collision detection information, the chassis collection information, the automatic driving assistance process information, the security gateway monitoring information, and the first computing device environment information; the second determining module is specifically configured:

for each type of data information, for the second vehicle fault processing device to determine whether it meets its corresponding preset reference range, where the data information is the first data information or the second data information; and for the second vehicle fault processing device to determine that a fault has occurred in the main system if there is at least one of the data information does not meet its corresponding preset reference range.

As a further implementation manner, on the basis of the above Embodiment 7, the second processing module is specifically configured:

for the second vehicle fault processing device to determine whether there is a control authority corresponding to a currently occurring fault according to the pre-configured control authority, if a fault has occurred in the main system; for the second vehicle fault processing device to control driving state of the vehicle, if it is determined that there is the control authority corresponding to the currently occurring fault; and for the first vehicle fault processing device to control the driving state of the vehicle, if it is determined that there is no control authority corresponding to the currently occurring fault.

Regarding the apparatus in this embodiment, the specific way for each module to perform operation has been described in detail in embodiments relating to the methods, which is not described in detail herein.

It should be noted that the manners in this embodiment may be implemented separately, or may be implemented in combination in any combination way in the case of no conflict.

In the apparatus for processing vehicle fault according to this embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system. And the first vehicle fault processing device may also monitor the second vehicle fault processing device in real time, that is, monitor the second computing device, to solve the problem that the driving state of the vehicle cannot be controlled in time, causing an accident when a fault has occurred in the main system, a fault has occurred in the second vehicle fault processing device either, and the control authority corresponding to the fault of the main system belongs to the second vehicle fault processing device.

Embodiment 9

This embodiment provides a device for processing vehicle fault, to perform the method for processing vehicle fault according to Embodiment 1 or Embodiment 2.

Figure 6:
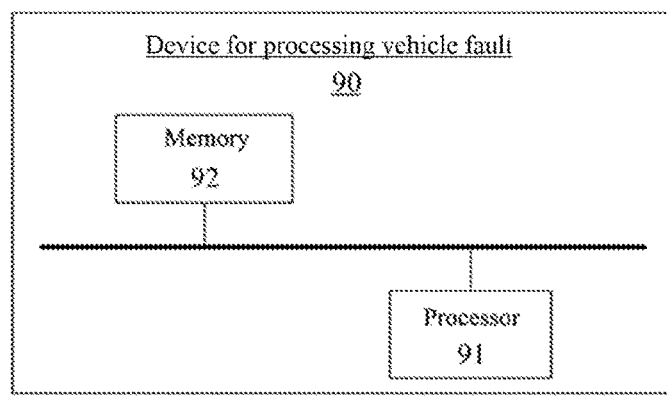
FIG. 6 is a schematic structural diagram of a device for processing vehicle fault according to an embodiment of the present disclosure.

As shown in FIG. 6, it is a schematic structural diagram of a device for processing vehicle fault according to an embodiment of the present disclosure. The device for processing vehicle fault is the first device for processing vehicle fault described above. The device for processing vehicle fault 90 includes at least one processor 91 and memory 92;

the memory stores a computer program; the at least one processor executes the computer program stored in the memory to implement the method according to the foregoing embodiments.

In the apparatus for processing vehicle fault according to this embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system. And the two devices for processing vehicle fault may also monitor each other in real time, to solve the problem that the driving state of the vehicle cannot be controlled in time, causing an accident when a fault has occurred in the main system, and a fault has occurred in a device for processing vehicle fault having corresponding control authority.

Embodiment 10

This embodiment provides a device for processing vehicle fault, to perform the method for processing vehicle fault according to Embodiment 3 or Embodiment 4.

Figure 7:
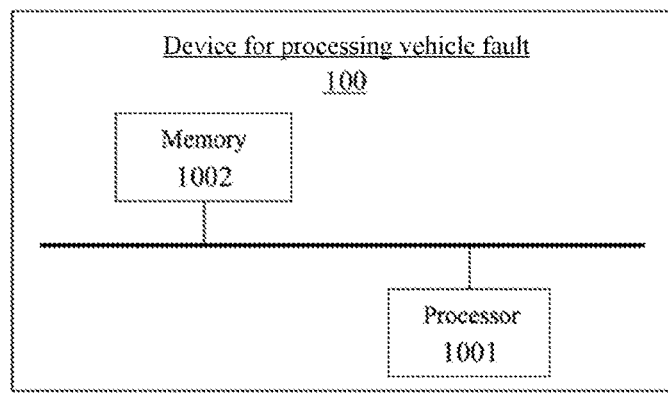
FIG. 7 is a schematic structural diagram of a device for processing vehicle fault according to another embodiment of the present disclosure.

As shown in FIG. 7, it is a schematic structural diagram of a device for processing vehicle fault according to an embodiment of the present disclosure. The device for processing vehicle fault is the second device for processing vehicle fault described above. The device for processing vehicle fault 100 includes at least one processor 1001 and memory 1002.

The memory stores a computer program; the processor executes a computer program stored in the memory to implement the method provided in the third embodiment or the fourth embodiment.

In the device for processing vehicle fault according to this embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system. And the two devices for processing vehicle fault may also monitor each other in real time, to solve the problem that the driving state of the vehicle cannot be controlled in time, causing an accident when a fault has occurred in the main system, and a fault has occurred in a device for processing vehicle fault having corresponding control authority.

Embodiment 11

The embodiment provides a computer readable storage medium, where the computer readable storage medium stores a computer program, and the method according to Embodiment 1 or Embodiment 2 is implemented when the computer program is executed.

According to the computer readable storage medium of this embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system. And the two devices for processing vehicle fault may also monitor each other in real time, to solve the problem that the driving state of the vehicle cannot be controlled in time, causing an accident when a fault has occurred in the main system, and a fault has occurred in a device for processing vehicle fault having corresponding control authority.

Embodiment 12

The embodiment provides a computer readable storage medium, where the computer readable storage medium stores a computer program, and the method according to Embodiment 3 or Embodiment 4 is implemented when the computer program is executed.

According to the computer readable storage medium of this embodiment, by isomorphically establishing a first vehicle fault processing device and a second vehicle fault processing device in an unmanned vehicle, monitoring a main system of the vehicle in real time, and sharing parameter data information of the main system obtained respectively by the two vehicle fault processing devices, so that both of them may obtain consistent fault results and perform control according to respective control authorities, which not only effectively improves safety of the vehicle, but also improves robustness of the unmanned system. And the two devices for processing vehicle fault may also monitor each other in real time, to solve the problem that the driving state of the vehicle cannot be controlled in time, causing an accident when a fault has occurred in the main system, and a fault has occurred in a device for processing vehicle fault having corresponding control authority.

In the several embodiments provided by the present application, it should be understood that the disclosed apparatus and method may be implemented in other manners. For example, the embodiments of the apparatus described above are merely illustrative, for example, the division of the units is only a logical function division, and in actual implementation, there may be other division manners, for example, multiple units or components may be combined or may be integrated into another system, or some features may be ignored or not executed. In addition, coupling or direct coupling or communication connection with each other shown or discussed may be indirect coupling or communication connection through some interfaces, apparatuses or units, and may be in an electrical, mechanical or other form.

Units described as separate components may or may not be physically separated, and components displayed as units may or may not be physical units, that is, may be located in one place, or may be distributed to multiple network units. Some or all of the units may be selected to achieve the purposes of the solutions of the embodiments according to actual needs.

In addition, each functional unit in each embodiment of the present application may be integrated into one processing unit, or each unit may exist physically separately, or two or more units may be integrated into one unit. The above integrated unit may be implemented in the form of hardware or in the form of hardware plus software functional units.

The above integrated unit implemented in the form of a software functional unit may be stored in a computer readable storage medium. The foregoing software functional unit is stored in a storage medium and includes some instructions for a computer device (which may be a personal computer, a server, or a network device, etc.) or a processor to perform part of the steps of the methods according to various embodiments of the present application. The foregoing storage medium may be any medium that is capable of storing program codes, such as a U disk, a mobile hard disk, a read-only memory (ROM), a random access memory (RAM), a magnetic disk, or an optical disk, and the like.

Persons of ordinary skill in the art may clearly understand that in order to describe conveniently and succinctly, only making the above functional module division for example. In practical applications, the above function division may be completed by different functional modules according to needs, that is, the internal structure of the apparatus is divided into different functional modules to complete all or part of the functions described above. For the specific working process of the apparatus described above, it may refer to the corresponding process in the foregoing embodiments of the methods, and details are not described herein again.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent substitutions to some technical features thereof, without departing from the spirit and scope of the technical solutions of embodiments of the present disclosure.

What is claimed is:

1. A method for processing vehicle fault, comprising:
   obtaining, by a first vehicle fault processing device, first data information of a main system of a vehicle in real time, obtaining second data information of the main system sent by a second vehicle fault processing device, and sending the first data information to the second vehicle fault processing device, so that the second vehicle fault processing device performs fault determination on the main system according to the first data information and the second data information;
   determining, by the first vehicle fault processing device, whether a fault has occurred in the main system according to the first data information and the second data information; and
   performing, by the first vehicle fault processing device, corresponding control on the vehicle according to a pre-configured control authority if the fault has occurred in the main system.

2. The method according to claim 1, further comprising:
   obtaining, by the first vehicle fault processing device, state information of the second vehicle fault processing device in real time;
   determining, by the first vehicle fault processing device, whether a fault has occurred in the second vehicle fault processing device according to the state information of the second vehicle fault processing device; and
   obtaining, by the first vehicle fault processing device, a control authority of the second vehicle fault processing device, and performing corresponding control on the vehicle if a fault has occurred in the second vehicle fault processing device.

3. The method according to claim 2, wherein the state information of the second vehicle fault processing device comprises heartbeat detection information and environment information of the second vehicle fault processing device;
   the determining, by the first vehicle fault processing device, of whether a fault has occurred in the second vehicle fault processing device according to the state information of the second vehicle fault processing device comprises:
   determining, by the first vehicle fault processing device, that a fault has occurred in the second vehicle fault processing device if the first vehicle fault processing device does not obtain the heartbeat detection information of the second vehicle fault processing device within a first preset time; and
   determining, by the first vehicle fault processing device, whether a fault has occurred in the second vehicle fault processing device according to the environmental information of the second vehicle fault processing device if the first vehicle fault processing device determines that a fault has not occurred in the second vehicle fault processing device according to the heartbeat detection information of the second vehicle fault processing device.

4. The method according to claim 1, wherein the first data information comprises at least one of frequency information, delay information, heartbeat detection information, collision detection information, chassis collection information, automatic driving assistance process information, security gateway monitoring information and first computing device environment information; the second data information comprises partial data information of the frequency information, the delay information, the heartbeat detection information, the collision detection information, the chassis collection information, the automatic driving assistance process information, the security gateway monitoring information, and the first computing device environment information.

5. The method according to claim 4, wherein the determining, by the first vehicle fault processing device, of whether a fault has occurred in the main system according to the first data information and the second data information comprises:
   for each type of data information, determining, by the first vehicle fault processing device, whether it meets its corresponding preset reference range, wherein the data information is the first data information or the second data information; and
   determining, by the first vehicle fault processing device, that a fault has occurred in the main system if there is at least one of the data information does not meet its corresponding preset reference range.

6. The method according to claim 1, wherein the performing, by the first vehicle fault processing device, of corresponding control on the vehicle according to the pre-configured control authority if a fault has not occurred in the main system comprises:
   determining, by the first vehicle fault processing device, whether there is a control authority corresponding to a currently occurring fault according to the pre-configured control authority if a fault has occurred in the main system;
   controlling, by the first vehicle fault processing device, a driving state of the vehicle if it is determined that there is the control authority corresponding to the currently occurring fault; and
   controlling, by the second vehicle fault processing device, the driving state of the vehicle if it is determined that there is no control authority corresponding to the currently occurring fault.

7. The method according to claim 1, further comprising:
   executing a computer program on a computer readable storage medium, wherein the computer readable storage medium stores a computer program is implemented when the computer program is executed.

8. A method for processing vehicle fault, comprising:
   obtaining, by a second vehicle fault processing device, second data information of a main system of a vehicle in real time, obtaining first data information of the main system sent by a first vehicle fault processing device, and sending the second data information to the first vehicle fault processing device, so that the first vehicle fault processing device performs fault determination on the main system according to the first data information and the second data information;
   determining, by the second vehicle fault processing device, whether a fault has occurred in the main system according to the first data information and the second data information; and
   performing, by the second vehicle fault processing device, corresponding control on the vehicle according to a pre-configured control authority if the fault has occurred in the main system.

9. The method according to claim 8, further comprising:
   obtaining, by the second vehicle fault processing device, state information of a first computing device in real time, and the first vehicle fault processing device and the main system are disposed on the first computing device;
   determining, by the second vehicle fault processing device, whether a fault has occurred in the first computing device according to the state information of the first computing device; and obtaining a control authority of the first vehicle fault processing device, and performing corresponding control on the vehicle, by the second vehicle fault processing device if a fault has occurred in the first computing device.

10. The method according to claim 9, wherein the state information of the first computing device comprises heartbeat detection information of the first computing device and environment information of the first computing device;
the determining, by the second vehicle fault processing device, of whether a fault has occurred in the first computing device according to the state information of the first computing device comprises:
determining, by the second vehicle fault processing device, whether a fault has occurred in the first computing device according to the heartbeat detection information of the first computing device and the environment information of the first computing device.

11. The method according to claim 8, wherein the first data information comprises at least one of frequency information, delay information, heartbeat detection information, collision detection information, chassis collection information, automatic driving assistance process information, security gateway monitoring information and first computing device environment information; the second data information comprises partial data information of the frequency information, the delay information, the heartbeat detection information, the collision detection information, the chassis collection information, the automatic driving assistance process information, the security gateway monitoring information, and the first computing device environment information.

12. The method according to claim 11, wherein the determining, by the second vehicle fault processing device, of whether a fault has occurred in the main system according to the first data information and the second data information comprises:
for each type of data information, determining, by the second vehicle fault processing device, whether it meets its corresponding preset reference range, wherein the data information is the first data information or the second data information; and
determining, by the second vehicle fault processing device, that a fault has occurred in the main system if there is at least one of the data information does not meet its corresponding preset reference range.

13. The method according to claim 8, wherein the performing, by the second vehicle fault processing device, of corresponding control on the vehicle according to the pre-configured control authority if a fault has occurred in the main system comprises:
determining, by the second vehicle fault processing device, whether there is a control authority corresponding to a currently occurring fault according to the pre-configured control authority if a fault has occurred in the main system;
controlling, by the second vehicle fault processing device, driving state of the vehicle if it is determined that there is the control authority corresponding to the currently occurring fault; and
controlling, by the first vehicle fault processing device, the driving state of the vehicle if it is determined that there is no control authority corresponding to the currently occurring fault.

14. The method according to claim 8, further comprising:
executing a computer program on a computer readable storage medium, wherein the computer readable storage medium stores a computer program is implemented when the computer program is executed.

15. An apparatus for processing vehicle fault, comprising a processor and a memory storing instructions thereon, the processor when executing the instructions, being configured to:
obtain first data information of a main system of a vehicle in real time, obtain second data information of the main system sent by a second vehicle fault processing device, and send the first data information to the second vehicle fault processing device, so that the second vehicle fault processing device performs fault determination on the main system according to the first data information and the second data information;
determine whether a fault has occurred in the main system according to the first data information and the second data information; and
perform corresponding control on the vehicle according to a pre-configured control authority, if the fault has occurred in the main system.

16. The apparatus according to claim 15, wherein the processor is further configured to:
obtain state information of the second vehicle fault processing device in real time;
determine whether a fault has occurred in the second vehicle fault processing device according to the state information of the second vehicle fault processing device; and
obtain a control authority of the second vehicle fault processing device, and perform corresponding control on the vehicle, if a fault has occurred in the second vehicle fault processing device.

17. The apparatus according to claim 16, wherein the state information of the second vehicle fault processing device comprises heartbeat detection information and environment information of the second vehicle fault processing device;
the processor is configured to:
determine that a fault has occurred in the second vehicle fault processing device, if the first vehicle fault processing device does not obtain the heartbeat detection information of the second vehicle fault processing device within a first preset time; and
determine whether a fault has occurred in the second vehicle fault processing device according to the environmental information of the second vehicle fault processing device, if the first vehicle fault processing device determines that a fault has not occurred in the second vehicle fault processing device according to the heartbeat detection information of the second vehicle fault processing device.

18. The apparatus according to claim 15, wherein the first data information comprises at least one of frequency information, delay information, heartbeat detection information, collision detection information, chassis collection information, automatic driving assistance process information, security gateway monitoring information and first computing device environment information; the second data information comprises partial data information of the frequency information, the delay information, the heartbeat detection information, the collision detection information, the chassis collection information, the automatic driving assistance process information, the security gateway monitoring information, and the first computing device environment information;
the processor is configured to:
for each type of data information, determine whether it meets its corresponding preset reference range, wherein the data information is the first data information or the second data information; and determine that a fault has occurred in the main system if there is at least one of the data information does not meet its corresponding preset reference range.

19. The apparatus according to claim 15, wherein the processor is configured to:

determine whether there is a control authority corresponding to a currently occurring fault according to the pre-configured control authority, if a fault has occurred in the main system;

control driving state of the vehicle, if it is determined that there is the control authority corresponding to the currently occurring fault; and control the driving state of the vehicle, if it is determined that there is no control authority corresponding to the currently occurring fault.

20. A device for processing vehicle fault, comprising at least one processor and a memory;

the memory stores a computer program; the at least one processor executes the computer program stored in the memory to implement the method according to claim 8.

* * * * *